(12) United States Patent
Brechling et al.

(10) Patent No.: US 10,515,501 B2
(45) Date of Patent: Dec. 24, 2019

(54) TESTING DEVICE FOR TESTING COIN BLANKS

(71) Applicant: SCHULER PRESSEN GMBH, Goeppingen (DE)

(72) Inventors: Carsten Brechling, Ulm (DE); Simon Kneer, Eislingen (DE); Horst Jaeschke, Birenbach (DE); Andreas Horeld, Pfinztal (DE)

(73) Assignee: SCHULER PRESSEN GMBH, Goeppingen (DE)

( * ) Notice: Subject to any disclaimer, the term of this patent is extended or adjusted under 35 U.S.C. 154(b) by 0 days.

(21) Appl. No.: 15/947,827

(22) Filed: Apr. 8, 2018

(65) Prior Publication Data

US 2018/0225902 A1 Aug. 9, 2018

Related U.S. Application Data

(63) Continuation-in-part of application No. PCT/EP2016/071895, filed on Sep. 15, 2016.

(30) Foreign Application Priority Data

Oct. 16, 2015 (DE) .................. 10 2015 117 601

(51) Int. Cl.
*G07D 3/12* (2006.01)
*G07D 3/02* (2006.01)
(Continued)

(52) U.S. Cl.
CPC ............ *G07D 3/14* (2013.01); *B65G 47/248* (2013.01); *B65G 47/256* (2013.01); *G07D 3/02* (2013.01);
(Continued)

(58) Field of Classification Search
CPC ...................................................... G07D 3/14; G07D 5/005; G07D 3/02; G07D 5/02; B65H 67/061; B65H 2301/30;
(Continued)

(56) References Cited

U.S. PATENT DOCUMENTS 5,322,152 A * 6/1994 Tommila ................. B07C 5/122
194/212
5,542,520 A * 8/1996 Beisel ...................... G07D 5/02
194/335

(Continued)

FOREIGN PATENT DOCUMENTS

CN 102 332 187 A 1/2012
DE 37 28 649 A1 3/1989
(Continued)

OTHER PUBLICATIONS

English translation of International Search Report for corresponding international application PCT/EP2016/071895, 2 pages, dated Nov. 3, 2016.

(Continued)

*Primary Examiner* — Jeffrey A Shapiro
(74) *Attorney, Agent, or Firm* — Ronald S. Lombard

(57) ABSTRACT

The invention relates to a testing device 10, that can be a component of a feeding device to feed coin blanks 11 to a coining press or a minting station 12. The testing device 10 has a contactless measuring first sensor device 30 and/or a second sensor device 40. Every sensor device 30, 40 that is present controls an associated removal device 32 or 41. Each sensor device 30, 40 detects a certain property of the coin blank and compares it with a corresponding standard specification. If an unacceptable deviation from the specification is detected, the sensor device 30, 40 in question controls the respective associated removal device 32, 41 to discharge the (Continued)

coin blank from a main conveyor device 13 which transports the coin blanks from a feeding end 14 to an exit end 15.

11 Claims, 2 Drawing Sheets

(51) Int. Cl.
    *G07D 3/14*     (2006.01)
    *G07D 5/02*     (2006.01)
    *B65G 47/256*     (2006.01)
    *B65G 47/248*     (2006.01)
    *G07D 5/00*     (2006.01)

(52) U.S. Cl.
    CPC .............. *G07D 3/126* (2013.01); *G07D 5/005* (2013.01); *G07D 5/02* (2013.01)

(58) Field of Classification Search
    CPC ........ B65H 2301/3111; B65H 2301/33; B65H 2301/332; B65G 47/24; B65G 47/248; B65G 47/258
    USPC ........ 453/7, 11, 56; 198/428, 438, 399, 402, 198/404
    See application file for complete search history.

(56) References Cited

U.S. PATENT DOCUMENTS

| | | | | |
|---|---|---|---|---|
| 6,648,747 | B1 * | 11/2003 | Zimmermann | G07D 3/02 453/7 |
| 9,430,893 | B1 * | 8/2016 | Blake | G07D 3/16 |
| 2004/0097182 | A1 * | 5/2004 | Hill | G07D 9/00 453/3 |
| 2005/0230219 | A1 * | 10/2005 | Winau | G07D 3/14 194/328 |
| 2011/0151759 | A1 * | 6/2011 | Horiguchi | G07D 3/14 453/3 |
| 2012/0301009 | A1 | 11/2012 | Dable | |
| 2014/0101924 | A1 * | 4/2014 | Mathieu | G01G 19/00 29/557 |
| 2015/0206368 | A1 * | 7/2015 | Fischer | G07D 3/14 453/3 |
| 2016/0214802 | A1 * | 7/2016 | De Block | B65G 47/248 |

FOREIGN PATENT DOCUMENTS

| | | |
|---|---|---|
| DE | 103 10 895 A1 | 9/2004 |
| DE | 10 2005 026 419 A1 | 12/2006 |
| DE | 102 592 353 A1 | 7/2012 |
| DE | 10 2013 105 560 A1 | 12/2014 |
| FI | 90 152 B | 9/1993 |
| FR | 2 734 356 A1 | 11/1996 |

OTHER PUBLICATIONS

Document No. DE 34 37 847 A1; Dated: Apr. 17, 1986; Germany; no translation.

\* cited by examiner

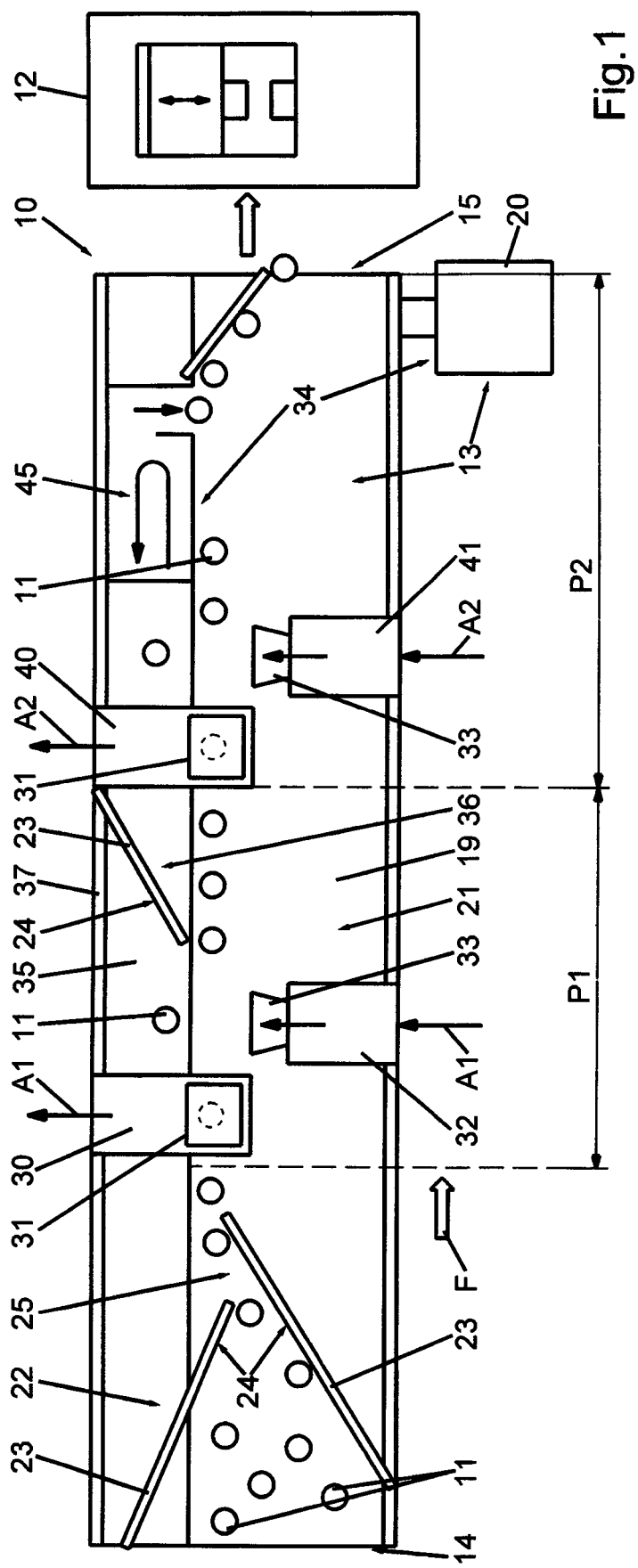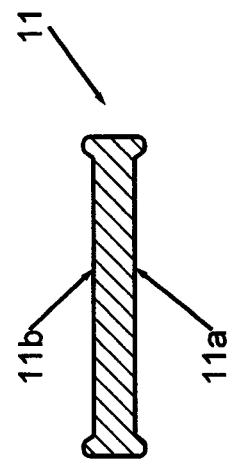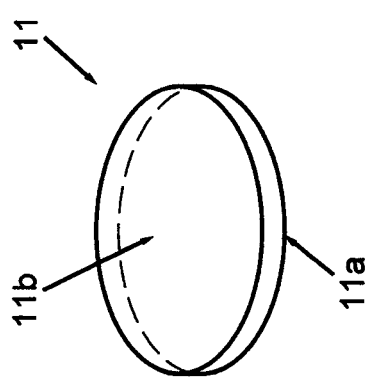

TESTING DEVICE FOR TESTING COIN BLANKS

CROSS-REFERENCE TO RELATED APPLICATION

This is a continuation-in-part application of pending international application PCT/EP2016/071895 filed Sep. 15, 2016, and claiming the priority of German application No. 10 2015 117 601.7 filed Oct. 16, 2015. The said International application PCT/EP2016/071895 and said German application No. 10 2015 117 601.7 are incorporated herein by reference in their entireties as though fully set forth.

BACKGROUND OF THE INVENTION

The invention relates to a testing device for testing coin blanks. When coins are minted, it is necessary to monitor their shape and size. This is important since many coin-operated machines have testing and checking devices to establish the authenticity of the coin.

Up to now, for quality assurance the minted coins have been conveyed one after the other into various containers. The last minted coin of a filled container was tested. If this coin was good, it was concluded from this that all coins in the container were good.

A similar random sampling test is described, for example, in DE 34 37 847 A1. There, the coin blanks are transported through a feeding device to a coining press. The minted coins are removed from the coining die by a removal device. To accomplish this, there is a slide through which the minted coins are fed directly to a storage or checking station. There, there can be a coin tray, for example, into every opening of which one coin is conveyed. There, a visual inspection is performed. The finished coins not tested by visual inspection are conveyed to an additional, separate storage station.

Such testing cannot check 100 percent of the coins. The quality of the coins can only be tested by random sampling. Starting from this, it can be considered the goal of this invention to improve the quality assurance of the minted coins.

SUMMARY OF THE INVENTION

This is accomplished by the testing device having the features of the claims. The invention relates to a testing device 10, that can be a component of a feeding device to feed coin blanks 11 to a coining press or a minting station 12. The testing device 10 has a contactless measuring first sensor device 30 and/or a second sensor device 40. Every sensor device 30, 40 that is present controls an associated removal device 32 or 41. Each sensor device 30, 40 detects a certain property of the coin blank and compares it with a corresponding standard specification. If an unacceptable deviation from the specification is detected, the sensor device 30, 40 in question controls the respective associated removal device 32, 41 to discharge the coin blank from a main conveyor device 13 which transports the coin blanks from a feeding end 14 to an exit end 15.

The inventive testing device is configured to test coin blanks when they are fed to a minting station. The testing device has a main conveyor device that conveys an unordered set of coin blanks provided at a feeding end in a conveyance direction to an exit end. The main conveyor device can be, for example, a conveyor belt. During conveyance, preferably one side of each coin blank lies on a conveying surface of the main conveyor device, while the other side faces up. The main conveyor device is preferably uninterruptedly powered to convey the coin blanks.

In one sample embodiment, the coin blanks are provided unsorted at the feeding end. Arranged behind the feeding end in the conveyance direction, there is preferably a separating device or guiding device, which arranges the coin blanks one after the other in the conveyance direction, and lines them up, so to speak, in the conveyance direction. The separations between the coin blanks need not be the same.

The testing device also has a first sensor device, which is preferably arranged after the separating device or guiding device in the conveyance direction. The first sensor device is configured to detect a shape and/or a dimension of the coin blank as it is conveyed in the conveyance direction, and to do so in a contactless manner, preferably optically. The first sensor device can have, for example, a camera. The detected shape and/or dimension is compared with at least one prespecified comparison model and/or at least one prespecified comparison value. If the detected shape and/or dimension is within the tolerance specified by the comparison model or the comparison value, then the coin blank is conveyed further through the main conveyor device. If the shape and/or dimension is/are found to have an unacceptably large deviation from the at least one comparison model or the at least one comparison value, the first sensor device is configured to control a first discharge device to discharge the coin blanks from the main conveyor device before they reach the exit end. Preferably, the coin blanks that do not meet the specifications are discharged from the main conveyor device through a first discharge opening and are collected in a container for rejects, for example.

In this way, coin blanks whose contour does not correspond to the desired contour or whose diameter is too large or too small at one or more places are sorted out. The change in shape during minting in the minting station is always the same. The fact that the testing device sorts out defective coin blanks already before minting means that random sampling quality control of the minted coins is sufficient to be able to establish with very high probability that all minted coins are free of defects.

The testing device is preferably a component of a feeding device to feed coin blanks to the minting station. Between the minting station and the exit end of the main conveyor device there can be another means of conveyance, such as, for instance a revolving plate or something of that kind.

Preferably, the first sensor device is configured to compare, in an image processing process, the dimension and/or the shape of the coin blank to be tested with at least one prespecified comparison model and/or comparison value. For example, the detected contour of the edge of the coin blank can be compared with a prespecified desired contour and it can be checked whether or not the deviations lie within specified tolerances. The dimension or shape can be detected without stopping the coin blank as it is being conveyed through the main conveyor device. The evaluation can be done very quickly, in particular through an image processing process. The evaluation time is sufficiently short to control the first discharge device arranged after the first sensor device in the conveyance direction and discharge a defective coin blank.

The first sensor device is preferably immovably arranged on a stand of the testing device. The main conveyor device moves the coin blanks past the first sensor device.

Moreover, it is advantageous if the main conveyor device has, extending from the feeding end toward the exit end, a main conveyor belt that is driven in a conveyance direction by a conveyor drive. As long as the coin blanks are not discharged, one side of each of them lies on the conveying surface of the main conveyor belt.

The conveyance in the conveyance direction can be continuous and without a stopping phase. This ensures that sufficiently many coin blanks per unit time can be transported to the minting station.

It is also advantageous if there is a second sensor unit which is configured to detect a characteristic of the upward-facing side of the coin blank as it is conveyed in the conveyance direction, and to do so in a contactless manner. For this purpose, the second sensor unit can have a camera. It is preferable if the characteristic detected by the second sensor unit is the color of the upward-facing side of the coin blank. This is important if the minted coin blanks are supposed to have different-colored sides. The sides of the coin blank need not have only a single color each, but rather can also have two or more colors. If the different colored surfaces are arranged differently on the two sides of the coin blank, the coin blank must be fed to the minting station with the one side facing up and with the other side facing down, to mint it on the side that is correct in each case. The correct position of the coin blank is determined by means of the second sensor unit.

The two sensor units have a sensor that works in a contactless manner and, in a preferred sample embodiment, an optical sensor such as, for instance, a camera. Alternatively or additionally, it is also possible to use sensors that emit other waves and/or receive reflected waves, e.g., an ultrasound sensor, a laser scanner, or a radar sensor. The waves can be sound waves and/or electromagnetic waves.

The second sensor unit can preferably be configured to compare the detected characteristic with at least one pre-specified comparison characteristic and, depending on the comparison result, to control a second discharge device. This second discharge device can discharge, from the main conveyor device, for example from the main conveyor belt, a coin blank whose upward-facing side has a characteristic that does not match the comparison characteristic and deviates to an unacceptable extent. The second discharge device can discharge this coin blank through a discharge opening or a feed it to an auxiliary conveyor device.

The auxiliary conveyor device can have, for example, an auxiliary conveyor belt. The main conveyor belt and the auxiliary conveyor belt can be driven by a common conveyor drive.

In a preferred embodiment, a turning device is present. The turning device is configured to turn a coin blank that is fed to it. When this happens, its side that has been facing downward up to that time is oriented upward, and its side that has been facing upward up to that time is oriented downward. In this turned orientation, the coin blank can be fed back to the main conveyor device.

Preferably, such coin blanks whose characteristic unacceptably deviates from the comparison characteristic can be fed, through the second discharge device, to the turning device.

It is further preferred if the turning device has an auxiliary conveyor device. As was explained, the auxiliary conveyor device can have an auxiliary conveyor belt. The auxiliary conveyor device transports, in a conveyance direction, a coin blank to be turned as it is being turned, or during the turning. The turning device can feed the turned coin blank in the conveyance direction to the main conveyor device before the exit end.

In a preferred embodiment, the first discharge device and/or the second discharge device is/are equipped with a controllable blowing unit. The blowing unit blows compressed air at an angle to or at right angles to the conveyance direction. This can move a coin blank at an angle to or at right angles to the conveyance direction and discharge it, for example, through a discharge opening, or feed it to the turning device.

The testing of the characteristic using the second sensor device and the feeding of coin blanks to be turned to the turning device can also be done separately from and independently of detecting, by means of the first sensor device, the shape and the dimension of the coin blank, and controlling the first discharge device. The testing device could have the second sensor device and the turning device even without the first sensor device and the first discharge device.

BRIEF DESCRIPTION OF THE DRAWINGS

Advantageous embodiments of the invention follow from the claims, the description, and the drawings. Preferred embodiments of the testing device are explained in detail below using the attached drawings. The figures are as follows:

FIG. 1 is a block diagram of a sample embodiment of a testing device and a minting station after it;

FIG. 2 is a highly schematic perspective view of a coin blank;

FIG. 3 is a sample embodiment of a cross section of a coin blank;

DETAILED DESCRIPTION OF THE INVENTION

Figure 4:
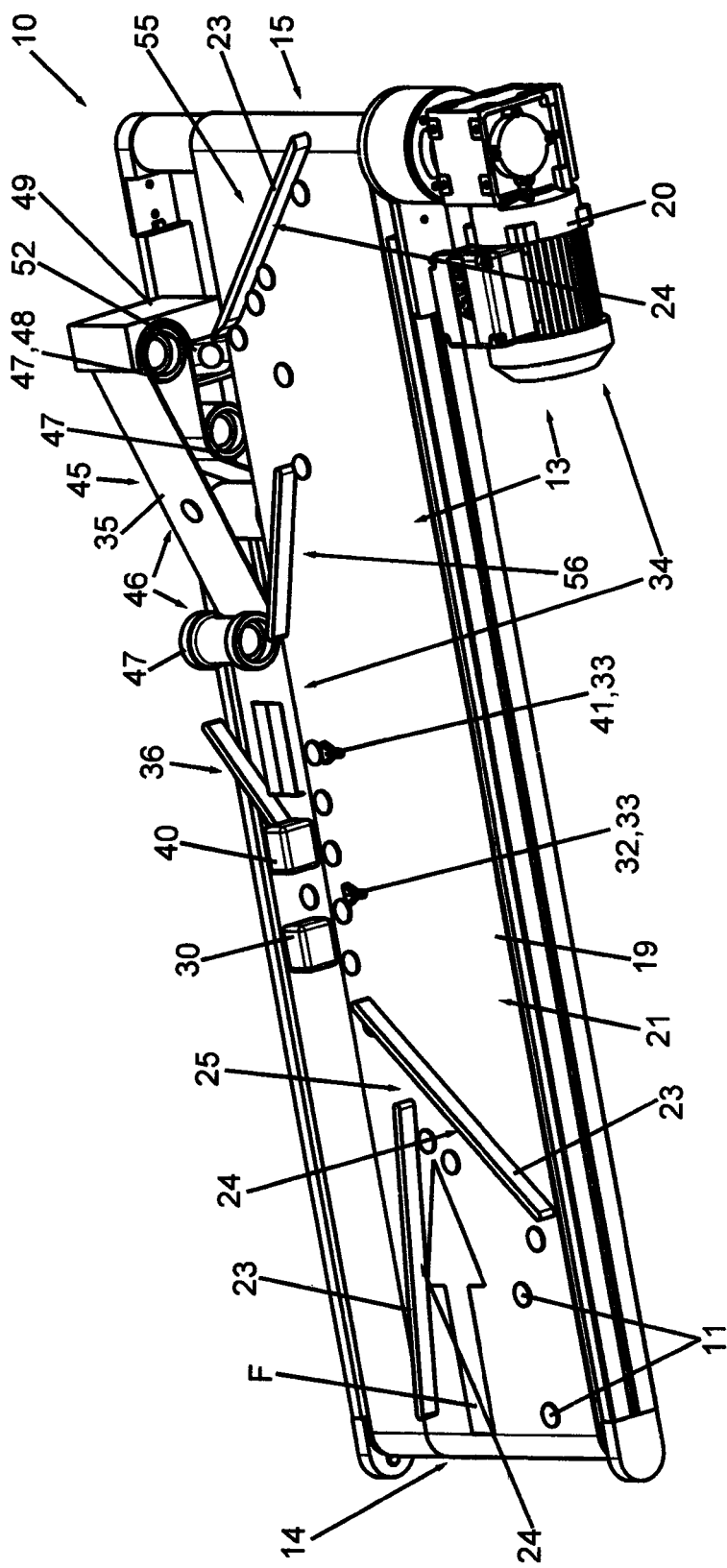
FIG. 4 is a schematic perspective representation of a sample embodiment of the testing device.

FIG. 1 shows a block diagram of a testing device 10 for testing coin blanks 11 as they are conveyed to a minting station 12. The testing device 10 forms an integrated testing and feeding device. It has a main conveyor device 13, which transports, in a conveyance direction F, the unsorted coin blanks 11 provided at a feeding end 14 and discharges them at an exit end 15 of the testing device 10. At the exit end 15, the coin blanks 11 can be transported further to the minting station 12, preferably through another conveying means, such as, for instance a revolving plate or something of that kind. In the sample embodiment, the main conveyor device 13 has a main conveyor belt 19 that is guided by a conveyor drive 20 so that it travels around rollers (not shown). The rollers of the main conveyor belt 19 are located at least at the feeding end 14 and at the exit end 15. The main conveyor belt 19 can have other rollers or other means of support between the feeding end 14 and the exit end 15.

The coin blanks 11 can have, for example, the shape schematically illustrated in FIGS. 2 and 3. Every coin blank 11 has a first side 11a and a second side 11b. As the coin blank 11 is being transported by the main conveyor device 13, one of these two sides 11a, 11b lies on a conveying surface 21 of main conveyor device 13, according to the example on the conveying surface 21 of the main conveyor belt 19. The other side of each coin blank is oriented facing upward, away from the conveying surface 21.

The coin blanks 11 need not necessarily have a circular contour. The contour of the edge of a coin blank 11 can also be polygonal or have any other shape. When viewed in cross section (FIG. 3), the coin blank can have a ring-shaped elevation in the area of its edge on both sides 11a and 11b.

After the feeding end 14 in the conveyance direction F, the testing device 10 has a first guiding device 22. The first guiding device 22 arranges the coin blanks 11 one after the other in the conveyance direction F, approximately in a row. This prevents coin blanks 11 being arranged next to one another when viewed in the conveyance direction F.

To accomplish this, the first guiding device 22 has at least one guiding device 23, and each guiding device 23 has a guiding surface 24. The guiding surface 24 of the at least one guiding device 23 is oriented at an angle to the conveyance direction F. The guiding surface 24 serves as a stop for the coin blanks 11 moved with the main conveyor belt 19. The movement of the main conveyor belt 19 in conveyance direction F allows the coin blanks 11 to slide along on the guiding surface 24 of a guiding device 23 and be released again at the end of the guiding device 23 or the guiding surface 24. In the sample embodiment, the first guiding device 22 has two guiding bodies 23 between which there is a gap 25 in conveyance direction F, through which the coin blanks 11 are conveyed and are placed on the main conveyor belt approximately in a row in the conveyance direction F. The two guiding bodies 23 have ends that are arranged at a distance to one another when viewed in conveyance direction F.

After the guiding device 22, a first sensor device 30 is immovably arranged on a stand, or something of that kind, of the testing device 10. The first sensor device 30 has a contactless measuring sensor, e.g., an optically measuring sensor such as, for instance a camera 31. The camera 31 or the sensor of the first sensor device 30 is arranged above the conveying surface 21 of the main conveyor belt 19, so that the coin blanks 11 leaving the guiding device 22 are moved, by means of the main conveyor belt 19, in conveyance direction F, beneath the sensor or the camera 31. To detect the coin blanks 11, they are not stopped, but rather are continuously transported in conveyance direction F by the main conveyor device 13 or the main conveyor belt 19.

The first sensor device 30 is configured to detect the shape or contour of the coin blank 11 and/or to detect one or one or more dimensions of the upward-facing side 11a or 11b of the coin blank 11. The sensor or the camera 31 produces a corresponding sensor signal that is compared, in the first sensor device 30, with a specified comparison model and/or comparison value to establish whether the detected shape or at least one dimension corresponds to the comparison model and/or comparison value, or that it lies within the specified tolerance. If this is not the case, but rather the coin blank 11 has an unacceptably large deviation with regard to its shape and/or at least one dimension of one of its two sides 11a, 11b, the first sensor device 30 produces a first control signal A1 to control a first discharge device 32.

The first discharge device 32 is arranged after the first sensor device 30 when viewed in conveyance direction F. In the sample embodiment described here, the first discharge device 32 has a blowing nozzle 33 which can blow a short stream of compressed air at an angle, preferably at right angles to the conveyance direction F. The blowing nozzle 33 is oriented toward the coin blanks 11 leaving the first sensor device 30. The first discharge device 32, according to the example the compressed air blast from the blowing nozzle 33, can discharge a coin blank 11 that does not correspond to the desired shape or that does not have the desired dimensions from the main conveyor device 13 or the main conveyor belt 19.

That is, according to the example the first discharge device 32 preferably works in a contactless manner, in particular without mechanically moved parts such as slides or things of that kind. Instead of a blowing nozzle 33 which moves the coin blank 11 with compressed air, it is also possible for there to be mechanical means, such as, for example, mechanical slides or movable deflectors or something of that kind, to sort out the out-of-tolerance coin blanks 11 in question. The blowing nozzle 33 has the advantage that the coin blanks can be moved with very little wear, without moving mechanical elements, and can be moved without problems even when the separation of the coin blanks in conveyance direction F is very small. The compressed air blast can be blown onto a coin blank 11 in a spatially very limited and targeted manner.

In the preferred sample embodiment, the testing device 10 has, in addition to the main conveyor device 13, an auxiliary conveyor device 34. The auxiliary conveyor device 34 has an auxiliary conveyor belt 35 that is arranged directly adjacent to the main conveyor belt 19. The main conveyor belt 19 and the auxiliary conveyor belt 35 extend in a common plane and are guided next to one another with as small a gap as possible between them. The auxiliary conveyor belt 35 moves in the conveyance direction F, preferably with the same speed as the main conveyor belt 19. In the sample embodiment, both the auxiliary conveyor belt 35 and the main conveyor belt 19 are driven by a common conveyor drive 20. The auxiliary conveyor belt 35 begins at the feeding end 14, however need not extend all the way to the exit end 15.

The first discharge device 32 moves an out-of-tolerance coin blank from the main conveyor belt 19 onto the auxiliary conveyor belt 35. After the first discharge device 32 in the conveyance direction F, the auxiliary conveyor belt 35 has a second guiding device 36 on it with at least one guiding device 23 and at least one guiding surface 24, this guiding device 23 serving to discharge, through a discharge opening 37, a coin blank that the first discharge device 32 has moved onto the auxiliary conveyor belt 35. The out-of-tolerance coin blanks 11 are sorted out as rejects and not fed to the minting station 12.

From the feeding end 14 to the first discharge device 32 or the discharge opening 37, the testing device 10 forms a first testing section P1, in which the first sensor device 30 is arranged. In this first testing section P1, the first sensor device 30 tests checks the coin blanks 11 for their observance of the shape and/or dimension.

In one sample embodiment of the testing device 10, the exit end 15 could be immediately after the first discharge device 32 or the discharge opening 37. In the sample embodiments illustrated in FIGS. 1 and 3, the testing device 10 has another, second testing section P2, that is additionally or alternatively used independently of the first testing section P1. Thus, the second testing section P2 could also be arranged immediately after the first guiding device 22.

The second testing section P2 of the testing device 10 has a second sensor device 40 arranged in it with a contactless measuring sensor, in particular, a camera 31. The sensor or the camera 31 is arranged above the main conveyor device 13 or the main conveyor belt 19, to be able to detect the coin blanks 11 that are conveyed below. The second sensor device 40 is configured to detect a characteristic of the upward-facing side 11a or 11b of the coin blank 11 as it is being conveyed in the conveyance direction F. This detected characteristic is different from the shape and/or at least one dimension detected by the first sensor device 30. The characteristic describes an optically perceivable property of the upward-facing surface of the coin blank 11. The second sensor device 40 preferably detects the color of the upward-facing side 11a or 11b of the coin blank 11.

The second sensor device 40 is also configured to compare the detected characteristic, according to the example the color or color arrangement, with a comparison characteristic and, depending on the comparison result, to control a second discharge device 41. The second sensor device 40 produces a second control signal A2 to actuate the second discharge device 41 if the detected color or color arrangement does not match the comparison color or comparison color arrangement. The second discharge device 41 is arranged after the second sensor device 40 in the conveyance direction F, and it causes the coin blank that is leaving the second sensor device 40 to move at an angle to, or at right angles to the conveyance direction F, and onto the auxiliary conveyor belt 35, if a deviation has been detected in the color or color arrangement.

This color detection and removal from the main conveyor device 13 and onto the auxiliary conveyor device 34 can be used, for example, in the case of coin blanks 11 whose first side 11*a* and second side 11*b* have different colors or different color arrangements or color patterns. During minting, it is of decisive importance that the coin blank 11 be fed to the minting station 12 with its correct side 11*a* or 11*b* facing up or down. Therefore, coin blanks that are transported with the wrong orientation in the main conveyor device 13 are discharged by the second discharge device 41 in the second testing section P2.

According to the example, both sensor devices 30, 40 are configured to perform a comparison of the detected sensor data with the specifications using an image processing process.

According to the example, the two removal devices 32, 41 have an identical structure. Each of them has a blowing nozzle 33 to move the coin blanks in question in a direction transverse to the conveyance direction F from the main conveyor belt 19 onto the auxiliary conveyor belt 35.

In the sample embodiment of the testing device 10 described here, there is also a turning device 45 that is associated with the auxiliary conveyor device 34 and that is located after the second discharge device 41 in the conveyance direction F. Coin blanks 11 whose sides 11*a*, 11*b* have different colors or color patterns and are being conveyed with the wrong orientation in the main conveyor device 19 are fed by the auxiliary conveyor device 34 to the turning device 45 to be turned. The turning device 45 is configured to turn the coin blanks that are fed to it, so that the side 11*a* or 11*b* that has, up to now, been facing the conveyor belt 19, 35 in question faces upward after being turned. The turned coin blanks 11 are then fed back to the main conveyor device 13, according to the example back to the main conveyor belt 19, and are finally discharged at the exit end 15.

A sample embodiment of a turning device 45 is illustrated in FIG. 4. The turning device 45 has a roller arrangement 46 with multiple rollers 47, to guide the auxiliary conveyor belt 35 out of the common plane with the main conveyor belt 19. On the input side, the turning device 45 has a roller 47 arranged above the auxiliary conveyor belt 35. Another roller 47, which is in the form of a turning roller 48, is arranged at a distance in the conveyance direction F. The axes of rotation of the input side roller 47 and the turning roller 48 are offset in a direction at right angles to the conveying surface 21 of the main conveyor belt 19, the turning roller 48 being at a greater distance from the conveying surface 19 than the input side roller 47. The auxiliary conveyor belt 35 is guided around the outside of the turning roller 48 and fed back to the feeding end 14 through other rollers 47 of the roller arrangement 46.

Figure 5:
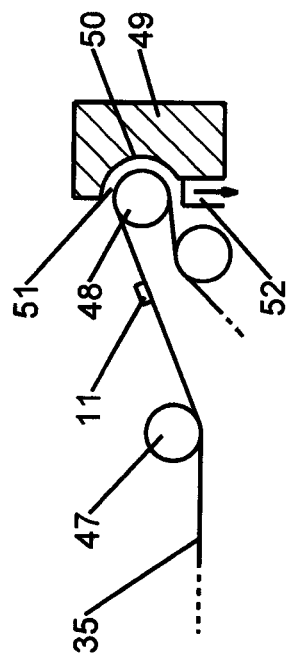
FIG. 5 is a schematic, block diagram-like representation of a turning device of the testing device.

A peripheral section of the turning roller 48 is surrounded by a guide body 49. The guide body 49 has a guide surface 50 facing the turning roller 48 (FIG. 5). When viewed in cross section at right angles to the axis of rotation of the turning roller 48, the guide surface 50 has the shape of a circular arc extending in an angular range of preferably at least 120°. Between the guide surface 50 and the auxiliary conveyor belt 35 guided around the turning roller 48 there remains a gap 51, whose thickness measured at right angles to the axis of rotation of the turning roller 48 approximately corresponds to the thickness of a coin blank 11. Thus, a coin blank 11 is guided through the gap 51 around the turning roller 48. This puts its previously upward-facing side 11*a* or 11*b* in a downward-facing orientation and the coin blank 11 is correspondingly turned.

Beneath the turning roller 48 there is a slide 52 that has a drop at an angle to or at right angles to the conveyance direction F and toward the main conveyor device 13 or the main conveyor belt 19. The turned coin blanks 11 slide along the slide 52 out of the turning device 45 and back onto the main conveyor belt 19.

According to the example, immediately after the slide 52 in the conveyance direction F there is a third guiding device 55 with at least one guiding device 23. The coin blanks that leave the turning device 45 on the slide 52, and the coin blanks 11 that have been conveyed by means of the main conveyor device 13 or the main conveyor belt 19 without being turned, are lined up by the third guiding device 45 and individually discharged at the exit end 15.

In the sample embodiment shown in FIG. 4 there is also a fourth guiding device 56 which, like the other guiding devices, has at least one guiding device 23 with a guiding surface 24. The fourth guiding device 56 is arranged after the second discharge device 41 in the conveyance direction F. The coin blanks 11 that are conveyed along the main conveyor belt 19 come in contact with the third guiding device 55 and are moved further inward, away from the auxiliary conveyor device 34 or the turning device 45, and onto the main conveyor belt 19. This can prevent collisions with coin blanks 11 that are moved back onto the main conveyor device 13 at the exit of the main conveyor device 35.

The invention relates to a testing device 10, that can be a component of a feeding device to feed coin blanks 11 to a coining press or a minting station 12. The testing device 10 has a contactless measuring first sensor device 30 and/or a second sensor device 40. Every sensor device 30, 40 that is present controls an associated removal device 32 or 41. Each sensor device 30, 40 detects a certain property of the coin blank and compares it with a corresponding standard specification. If an unacceptable deviation from the specification is detected, the sensor device 30, 40 in question controls the respective associated removal device 32, 41 to discharge the coin blank from a main conveyor device 13 which transports the coin blanks from a feeding end 14 to an exit end 15.

LIST OF REFERENCE NUMBERS

10 Testing device
11 Coin blank
11*a* First side of the coin blank
11*b* Second side of the coin blank
12 Minting station
13 Main conveyor device
14 Feeding end
15 Exit end
19 Main conveyor belt 20 Conveyor drive
21 Conveying surface
22 First guiding device
23 Guiding device
24 Guiding surface
25 Gap
30 First sensor device
31 Camera
32 First discharge device
33 Blowing nozzle
34 Auxiliary conveyor device
35 Auxiliary conveyor belt
36 Second guiding device
37 Discharge opening
40 Second sensor device
41 Second discharge device
45 Turning device
46 Roller Arrangement
47 Roller
48 Turning roller
49 Guide body
50 Guide surface
51 Gap
52 Slide
55 Third guiding device
56 Fourth guiding device
F Conveyance direction
P1 First testing section
P2 Second testing section

What is claimed is:

1. A testing device (10) for testing coin blanks (11) as they are fed to a minting station (12), comprising:
   a main conveyor device (13) which conveys, in a conveyance direction (F), coin blanks (11) provided at a feeding end (14) to an exit end (15);
   a first sensor device (30) that is configured to detect, in a contactless manner, a shape and/or a dimension of the coin blank (11) as it is conveyed in the conveyance direction (F), to compare this shape and/or dimension with at least one prespecified comparison model and/or comparison value, and, depending on the comparison result, to control a first discharge device (32) to discharge, from the main conveyor device (13), coin blanks (11) whose shape and/or dimension have an unacceptably large deviation before they reach the exit end (15);
   the main conveyor device (13) has, extending from the feeding end (14) toward the exit end (15), a main conveyor belt (19) that is driven in the conveyance direction (F) by a conveyor drive (20);
   a second sensor device (40) is configured to contactlessly detect a characteristic of an upward-facing side (11a, 11b) of the coin blank (11), as it is being conveyed via the main conveyor belt (19) in the conveyance direction (F);
   the second sensor device (40) is further configured to compare the detected characteristic of the upward-facing side (11a, 11b) of the coin blank (11) with at least one pre-specified comparison characteristic and depending on the comparison result to control a second discharge device (41); and,
   the second discharge device (41) is configured to discharge coin blanks with a detected characteristic unacceptably deviating from the at least one pre-specified comparison characteristic to an auxiliary conveyor device (34) comprising an auxiliary conveyor belt (35),
   wherein the auxiliary conveyor device (34) is provided to convey the coin blank to a turning device (45), wherein the turning device (45) is configured to turn the coin blank and to convey the turned coin blank back to the main conveyor device (13), wherein the turning device (45) comprises the auxiliary conveyor belt (35) and at least one roller (47).

2. A testing device according to claim 1, characterized in that a first guiding device (22) arranged, in the conveyance direction (F), after the feeding end (14) and before the first sensor device (30) discharges the coin blanks (11) so that they are arranged one behind the other in the conveyance direction (F).

3. A testing device according to claim 1, characterized in that the first sensor device (30) comprises a camera (31).

4. A testing device according to claim 1, characterized in that the first sensor device (30) is configured to compare, in an image processing process, the dimension and/or the shape of the coin blank (11) to be tested with at least one prespecified comparison model and/or comparison value.

5. A testing device according claim 1, characterized in that the first discharge device (32) is configured to move coin blanks (11) whose shape and/or dimension has/have an unacceptably large deviation into a discharge opening (37) before they reach the exit end (15).

6. A testing device according to claim 1, characterized in that the characteristic detected of the upward-facing side (11a, 11b) of the coin blank (11) is its color or color arrangement.

7. A testing device according claim 1, characterized in that there the turning device (45) is configured to turn a coin blank (11), so that its one side (11a or 11b) faces upward and its other side (11b or 11a), which has been facing upward up to now, is facing downward.

8. A testing device according to claim 1, characterized in that the turning device (45) associated with the auxiliary conveyor device (34) is configured to transport the coin blank (11) to be turned in the conveyance direction (F) as it is being turned.

9. A testing device according to claim 1, characterized in that the first and/or second discharge device (31, 41) has a controllable slide and/or a controllable blowing nozzle (33), which can blow compressed air at an angle to, or at right angles to the conveyance direction (F) to displace a coin blank (11).

10. A testing device according to claim 7, characterized in that the at least one roller (47) of the turning device (45) includes a turning roller (48) for turning the coin blank (11) and a guide body (49) surrounding the turning roller (48), the guide body (49) having a guide surface (50) having the shape of a circular arc extending in an angular range, between the guide surface (50) and the auxiliary conveyor belt (35) being guided around the turning roller (48) there is a gap (51) having a thickness measured at right angles to an axis of rotation of the turning roller (48) which is about the thickness of the coin blank (11).

11. A testing device according to claim 10, characterized in that beneath the turning roller (48) there is a slide (52) having a drop at an angle to or at right angles to the conveyance direction (F) and toward the main conveyor device (13) or the main conveyor belt (19), wherein the turned coin blanks (11) are caused to slide along the slide (52) out of the turning device (45) and back onto the main conveyor belt (19).

* * * * *